US 6,746,073 B2

(12) United States Patent
Heller et al.

(10) Patent No.: US 6,746,073 B2
(45) Date of Patent: Jun. 8, 2004

(54) LOCK SYSTEM FOR A CABRIOLET CONVERTIBLE TOP

(75) Inventors: Alexander Heller, Munich (DE); Burkhad Reinsch, Kaufbeuren (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/420,939

(22) Filed: Apr. 23, 2003

(65) Prior Publication Data

US 2004/0046416 A1 Mar. 11, 2004

(30) Foreign Application Priority Data

Apr. 24, 2002 (DE) .......................................... 102 18 307

(51) Int. Cl.[7] .................................................. B60J 7/00
(52) U.S. Cl. ...................... 296/121; 296/120.1; 292/33; 292/DIG. 5
(58) Field of Search .............................. 296/121, 120.1; 292/DIG. 5, 32, 33, 41; 91/446

(56) References Cited

U.S. PATENT DOCUMENTS

| | | | | |
|---|---|---|---|---|
| 1,556,864 | A | * 10/1925 | Mendenhall | 292/33 |
| 1,698,745 | A | * 1/1929 | Tracy | 292/162 |
| 5,454,292 | A | * 10/1995 | Oudelaar | 91/446 |
| 5,499,855 | A | * 3/1996 | Andres et al. | 296/121 |
| 5,755,467 | A | * 5/1998 | Dilluvio et al. | 292/DIG. 5 |
| 5,944,375 | A | * 8/1999 | Schenk et al. | 296/121 |
| 6,047,999 | A | * 4/2000 | Dixon, Jr. | 292/32 |
| 6,158,786 | A | * 12/2000 | Droste et al. | 292/DIG. 5 |
| 6,213,534 | B1 | * 4/2001 | Mac Farland | 296/121 |
| 6,601,906 | B2 | * 8/2003 | Deadrick et al. | 296/121 |
| 6,666,482 | B2 | * 12/2003 | Hansen et al. | 292/24 |
| 2004/0032148 | A1 | * 2/2004 | Hasselgruber et al. | 296/121 |

FOREIGN PATENT DOCUMENTS

| | | | |
|---|---|---|---|
| DE | 3917284 | * | 11/1990 |
| DE | 39 17 284 A1 | | 12/1990 |
| DE | 41 11 646 | * | 10/1992 |
| DE | 692 02 318 T2 | | 10/1992 |
| DE | 41 21 226 C1 | | 10/1993 |
| DE | 4326291 | * | 9/1994 |
| DE | 29703774 | * | 11/1997 |
| DE | 197 37 031 A1 | | 3/1999 |
| DE | 196 34 511 C1 | | 8/1999 |
| DE | 19944853 | * | 12/2000 |
| DE | 198 32 385 A1 | | 5/2001 |
| DE | 10139187 | * | 3/2002 |
| GB | 2141482 | * | 12/1984 |

* cited by examiner

*Primary Examiner*—Kiran Patel
(74) *Attorney, Agent, or Firm*—Nixon Peabody LLP; David S. Safran

(57) ABSTRACT

A lock system (10) for a cabriolet convertible top, with a drive device (12) which actuates at least two lock elements (14, 16). A drive cable (18, 20) which has a core (22, 24) which is suitable for transferring compressive and tension forces is provided between the drive device (12) and each of at least two lock elements (14, 16) for actuating the at least two lock elements (14, 16). Furthermore, a ring bearing for use with the lock system has an annular configuration that facilitates insertion of a locking journal (34) and enables tolerances in the transverse and vertical direction to be accommodated.

20 Claims, 5 Drawing Sheets

LOCK SYSTEM FOR A CABRIOLET CONVERTIBLE TOP

BACKGROUND OF THE INVENTION

1. Field of the Invention

The invention relates to a lock system for a cabriolet convertible top, with a drive device which actuates at least two lock elements. Furthermore, the invention relates to a ring bearing for use with the lock system, a roof structure for a cabriolet, and a cabriolet.

2. Description of Related Art

Both in cabriolets which have a folding roof structure, and also in cabriolets which have a hardtop roof structure, the roof structure must be locked at least in its closed position or must be interlocked with the body of the cabriolet. Cabriolets with a hardtop roof structure have two or more stable roof components which must be likewise locked or interlocked to one another at least in the closed position of the roof structure.

To lock the respective roof structure, generic lock systems are used. For example, the lock systems known from German Patent DE 196 34 511 C1 and corresponding U.S. Pat. No. 5,944,375, for use with a movable roof structure for an open passenger car having a front roof part of stable shape and a rear roof part of stable shape, the rear roof part being supported to be able to pivot around the vehicle-mounted pivot axis between its closed operating position and its open rest position, and in which the front roof part can be displaced by means of a double-sided parallelogram rod between its closed operating position and its opened rest position has, in order to pull the movable roof structure tightly against the transverse windshield support and to interlock the front roof shell with the transverse windshield support, an interlocking device in the front roof shell which has locks which are spaced relative to one another over the motor vehicle width and which are each provided with a centering aid and the detent pawls. The locks are synchronized with one another in order to ensure that they simultaneously open and close. For this purpose, a coupling rod is guided from each lock toward the vehicle middle, and are supported on opposite sides of an axis of rotation of a central rotary lever. The opposing outer ends of the two coupling rods are dynamically connected to the detent pawls of the locks. The rotary lever is turned by a hydraulic cylinder around a roughly vertical axis of rotation, by which the detent pawls, and thus the locks, can be actuated according to the desired opening or interlocking process. Here, it is furthermore provided that one of the two locks actuated via the coupling rods actuates a Bowden cable in order to release a blocking mechanism when the locks are opened. For this purpose, the Bowden cable transfers a pull to the blocking mechanism which is pre-tensioned by springs into the blocked position when the locks are opened.

The lock system which actuates the locks via coupling rods according to German Patent DE 196 34 511 C1 and U.S. Pat. No. 5,944,375, is complex, and therefore, expensive. Moreover, in order to be able to use the lock system for different roof structures, structural changes are necessary, for example, with respect to the length of the coupling rods and so forth.

SUMMARY OF THE INVENTION

The primary object of the present invention is to provide a lock system which has a simple structure and which can be economically produced and flexibly used.

This object is achieved by a drive cable for actuating at least two lock elements being provided between the drive device and each of at least two lock elements, the drive cable having which has a core which is suitable for transfer of compressive and pulling forces.

The lock system in accordance with the invention uses drive cables for actuating the at least two lock elements which are, preferably, flexible or slightly bendable drive cables, so that complicated power transmission rods and the like can be omitted; this greatly simplifies the structure of the lock system. The lock system in accordance with the invention can be used without structural changes with different roof structures due to the flexibility or bending capacity of the drive cables. The directions of the compressive and pulling forces necessary for actuating the individual lock elements can run in any direction. The lock system in accordance with the invention can be used both for folding roof structures and also in hardtop roof structures to interlock the convertible top in its closed position with the vehicle body. In hardtop roof structures, the lock system in accordance with the invention can, moreover, be used to lock or interlock the individual convertible top segments relative to one another. The lock system can be mounted both in or on the roof structure and body-side. In particular, in conjunction with hardtop roof structures the lock system in accordance with the invention can be used additionally or alternatively to secure the opened convertible top which has been assembled into a so-called storage package and stored in the stowage space intended for this purpose. Depending on the embodiment, a lock system which is assigned to the roof structure and/or the lock system which is located in the stowage space can be used for this purpose.

In many applications, it is advantageous for the drive device to synchronously actuate at least two lock elements. Of course, it is likewise possible for the drive device to synchronously actuate more than two lock elements or for there to be different groups of lock elements which are each synchronously actuated.

Furthermore, in the lock system in accordance with the invention, it can be provided that the drive device has electrical and/or pneumatic and/or hydraulic and/or mechanical and/or manual drive means. Even if compressive and pulling forces in different directions are necessary for actuating the individual lock elements, in many cases it is sufficient if the drive means execute a simply linear motion; this can be easily implemented, for example, by hydraulic drive means.

In one preferred embodiment of the lock system in accordance with the invention, it is provided that the drive device has a slider which is guided by the guide element and which is connected to the cores of the drive cables. The guide element can be formed, for example, by the housing sections of the drive device. To connect the cores of the drive cables to the slider, the slider can have, for example, recesses into which the corresponding ends of the cores can be hooked.

One advantageous development of the lock system in accordance with the invention calls for the drive device to limit the possible path of movement of the slider. To limit the path of the slider, preferably, there are corresponding stops which can be formed by the housing of the drive device. Limitation of the path of motion of the slider enables especially a central end stop to determine the path of motion for all lock elements. If the drive device uses hydraulic drive means, it is especially advantageous if the stops are formed by the housing of the drive device since, in this case, a defined stop in the hydraulic cylinder can be omitted.

Another advantageous development of the lock system in accordance with the invention calls for the drive device to have a catch which interacts with the slider in at least one position of the slider. The catch can be provided especially for securing the entire lock system in the closed state against unintended movements. This is advantageous especially for an unpressurized hydraulic cylinder or for a electrical drive that is not self locking.

In preferred embodiments of the lock system in accordance with the invention, it is provided that at least one lock element has interlocking means which comprise a journal and/or a hook which is intended to fit into a bearing for locking the cabriolet convertible top. The bearing or bearings can be made either as a separate component or can be integrated into components which are present anyway.

In some embodiments of the lock system in accordance with the invention, it can be advantageous if it is provided that at least one lock element has at least one spring which pretensions the interlocking means in the direction of a locking position. For example, if the interlocking means are formed by a journal and a stop for the journal is desired in the lengthwise direction, pre-tensioning can be provided in an advantageous manner.

One preferred embodiment of the lock system in accordance with the invention calls for at least one lock element to have a journal which is cylinder-shaped at least in sections and which is engaged by the core of a respective drive cable in order to move the journal axially back and forth. To connect the core of the drive cable to the journal, the end section of the core can have, for example, a fitting which fits positively or non-positively into a recess which is provided in the journal.

Furthermore, in this connection, it can be advantageously provided that the cylinder-shaped journal, has at least a tapering end section which is designed to be moved in or through an annular bearing for locking the cabriolet convertible top. The tapering end section of the journal simplifies the insertion of the journal into the bearings and produces centering.

The invention also relates to a ring bearing for use with the lock system in accordance with the invention, the bearing being provided with an internal geometry which enables ring contact with the cylindrical section of the journal. Tilting and jamming of the lock system are effectively prevented by the ring or point contact between the bearing and the journal.

In general, the invention also relates to a roof structure for a cabriolet which is provided with at least one lock system in accordance with the invention for locking at least one segment of the roof structure. The concept of roof structure can also comprise, for example, the stowage space intended for storage of the opened convertible top, if there are one or more lock systems in accordance with the invention there in order to secure the convertible top in the opened and lowered state.

In particular, in a hardtop structure, it can be provided that the structure has a front segment, a roof segment, and a C column segment, and that at least one lock system is located in the roof segment in order to lock the roof segment to the front segment and/or the C column segment. This does not preclude that, for example, there is a lock system in accordance with the invention in the front segment in order to interlock the front segment to the transverse windshield support.

It is considered especially advantageous for the roof structure under consideration if it is provided with at least two bearings, especially two of the ring bearings in accordance with the invention, each of which is designed to interact with a respective lock element.

The invention also relates to a cabriolet which is provided with at least one lock system in accordance with the invention.

It can be advantageously provided here that the cabriolet convertible top, in the closed state, can be locked by at least one lock system which interacts with bearings arranged accordingly, especially ring bearings in accordance with the invention.

One especially preferred embodiment of the cabriolet in accordance with the invention calls for the cabriolet convertible top, in the opened and stored state, to be lockable by at least one lock system which interacts with bearings arranged accordingly, especially ring bearings in accordance with the invention. In hardtop roof structures, for example, unwanted movements of the roof shells which have been deposited in the trunk in the opened position of the roof system are prevented. For this purpose, for example, there can be a lock element which is arranged on the cover of the convertible top compartment and which can be driven by the drive system of the lock elements of the cover of the convertible top compartment. The drive device for the lock elements of the cover of the convertible top compartment can be structurally identical to the drive device for the cabriolet convertible top.

One especially efficient solution is achieved if it is provided that at least one bearing interacts with a lock element both for securing the cabriolet convertible top in its closed position and also for securing the cabriolet convertible top in its opened and deposited position. For example, it can be provided that the journal of a lock element which is attached to the cover of the convertible top compartment fits into the bearing of the front segment which is present anyway, and the lock element which is attached to the cover of the convertible top compartment can be structurally identical to the other lock elements.

The invention enables central driving of several distributed lock elements, which also enables simple emergency actuation of the lock system. Furthermore, the lock system in accordance with the invention requires only little installation space; this benefits the size of the stored package. The lock elements need not be attached directly to the drive device, by which better use for example of the convertible top installation space can be achieved, since individual modules can be located in the unused areas. Since equalization of tolerances takes place advantageously via the lock elements, tolerance equalization in the overall system is easily possible.

The invention is explained by way of example with reference to the attached drawings using preferred embodiments.

DETAILED DESCRIPTION OF THE INVENTION

Figure 1:
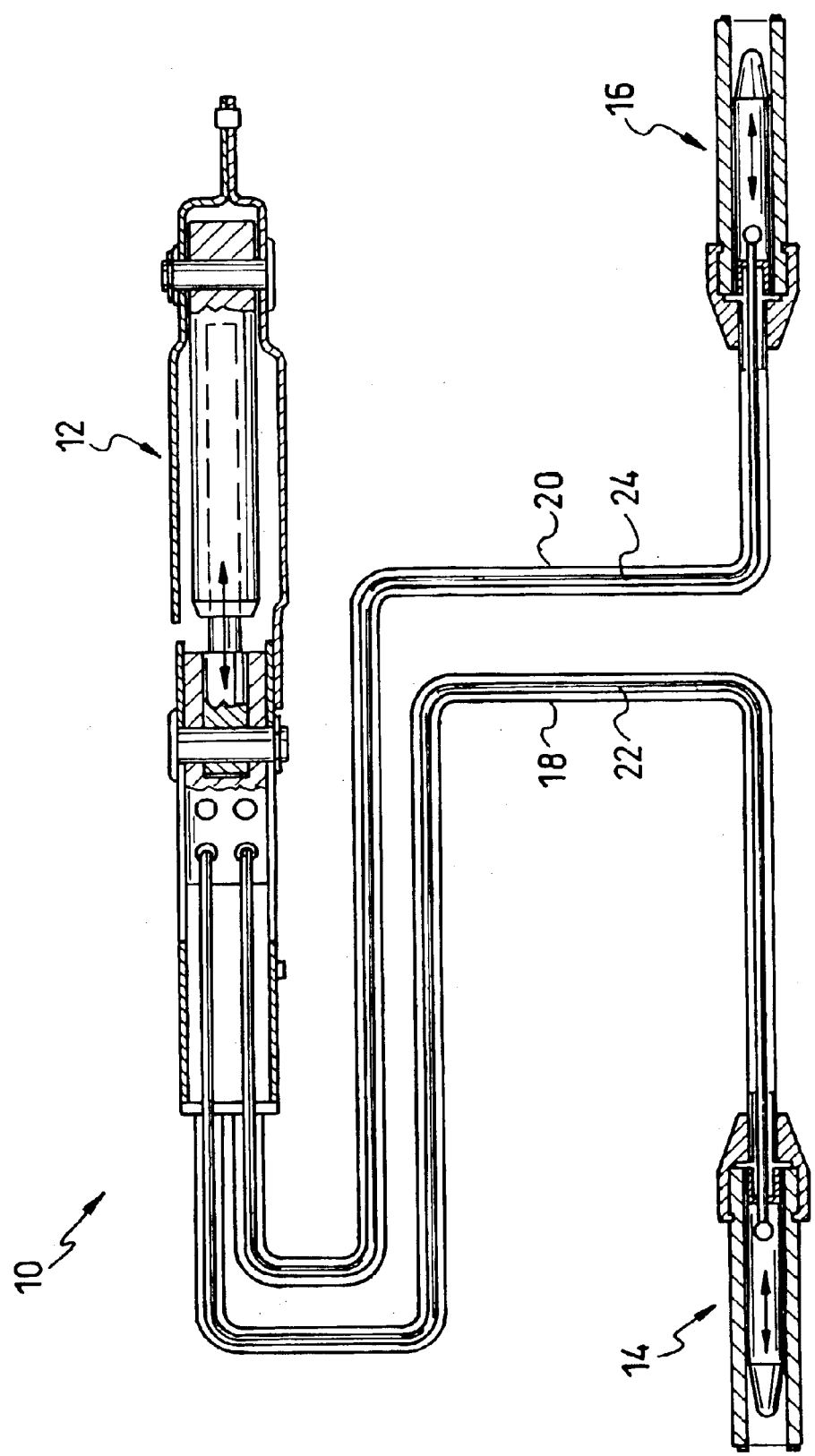
FIG. 1 is a schematic lengthwise sectional view of one embodiment of the lock system in accordance with the invention for a cabriolet convertible top, comprising a drive device and two lock elements actuated by it via drive cables.

FIG. 1 shows one embodiment of a lock system 10 in accordance with the invention for a cabriolet convertible top in a lengthwise schematic sectional view which is driven via a central drive device 12. The actuating motion and force are routed to the actual lock elements 14, 16 via the cores 22, 24 of the two drive cables 18, 20, e.g., a Bowden cable. The lock elements 14, 16 comprise a pin or journal which is pushed into a bearing, which is not shown in FIG. 1, for locking. The components shown in FIG. 1 are explained in further detail below.

Figure 2:
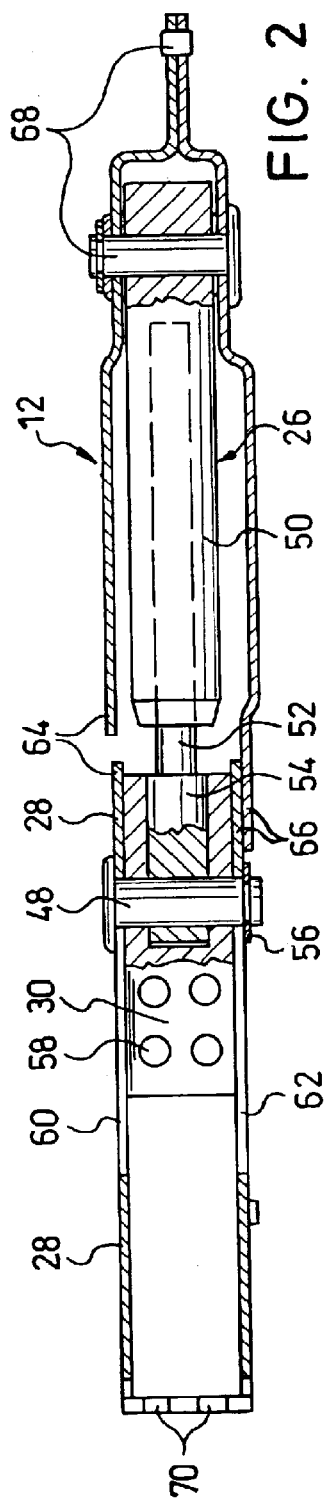
FIG. 2 shows a lengthwise sectional view of the drive device from FIG. 1 in the first working position.
Figure 3:
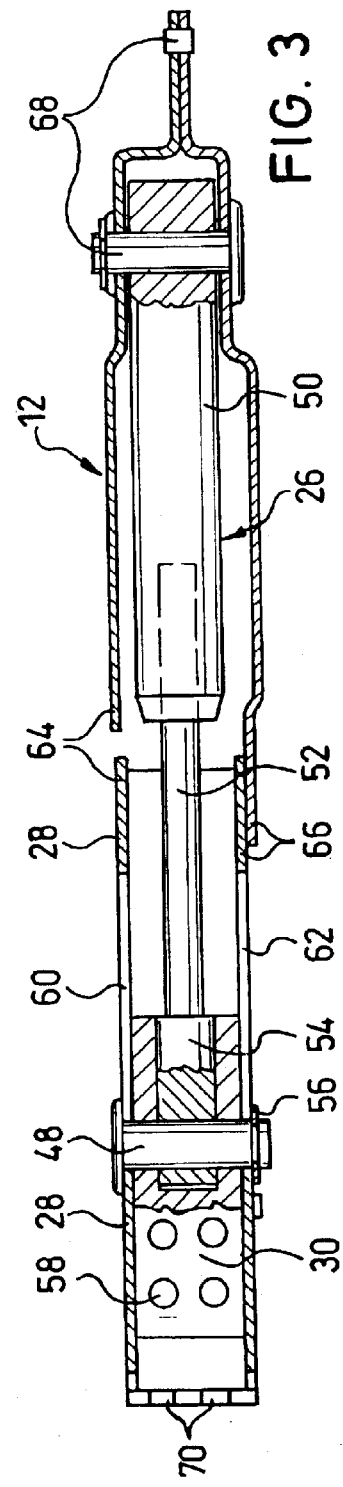
FIG. 3 shows a lengthwise sectional view of the drive device from FIG. 1 in the second working position.
Figure 4:
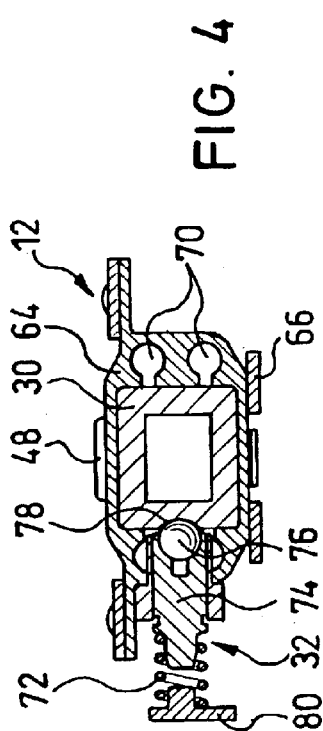
FIG. 4 is a front sectional view of the drive device from FIG. 1.

The drive device shown in FIGS. 2 to 4 has an upper housing half 64 and a lower housing half 66. The upper and lower housing halves 64, 66 can be made in one or more parts of one or more materials. In the drive device 12, there are drive means 26 which are formed, in this case, as a hydraulic drive means. The hydraulic drive means 26 comprise a hydraulic cylinder 50 (which is shown only schematically) which interacts with a hydraulic piston 52. On the end section of the hydraulic piston 52 which is on the left in FIGS. 2 & 3, there is a hydraulic piston adapter 54 which is connected in a suitable manner to the hydraulic piston 52, for example, by a screw connection. The part of the upper and lower housing halves 64, 66 which is on the left in FIGS. 2 & 3, in this embodiment, forms a guide element 28 for a slider 30. The slider 30 can be pushed from the left to the right in FIGS. 2 & 3 within the drive device 12, guided by the guide element 28.

Relative to what is shown in FIG. 4, the slider 30 moves into and out of the plane of the figure. The slider 30, like the hydraulic piston adapter 54, has a hole through which a connecting pin 48 extends. Thus, there is a non-positive connection between the slider 30 and the hydraulic piston 52 which drives the slider 30. In the upper housing half 64, there is a first slot 60, while in the lower housing half 66 there is a second slot 62. The connecting pin 48 at the top has a head with a diameter which is larger than the width of the first slot 60. The same applies to a retaining ring 56 which is provided in the lower area of the connecting pin 48. The connecting pin 48 is thus pushed in the first slot 60 and the second slot 62 when the slider 30 is moved by the hydraulic piston 52. In this way, the left and right ends of the first and second slots 60, 62 form a stop for the connecting pin 48. Accordingly, the path of motion of the slider 30, and thus, the path of motion of the lock elements, are limited and a stop in the hydraulic cylinder can be omitted. Connecting means 68 which connect the upper housing half 64 to the lower housing half 66 comprises a connecting pin which is made similarly to the connecting pin 48, but which cannot execute any translational motion.

In FIG. 2, the connecting pin 48 is at its first end stop which is fixed by the first and second slots 60, 62, while the connecting pin 48 in the representation from FIG. 3 is at its second end stop which is likewise fixed by the first and the second slots 60, 62. Accordingly, the slider 30 is shown in its right end position in FIG. 2, while in FIG. 3 it is shown in its left end position. The slider 30 has recesses 58 in which the cores of two drive cables (which are not shown in FIGS. 2 to 4) can be attached, for example, via simple plug connections. Furthermore, there are drive cable receivers 70 in which the jackets of the drive cables are fixed.

In addition to the components of the drive device 12 which are explained at least in part using FIGS. 2 & 3, FIG. 4 shows a catch 32 which is assigned to the drive device 12. The catch 32 is made as a ball catch and is used to secure the entire lock system against unwanted displacement in the closed state with hydraulic cylinder 50 unpressurized. To implement the catch, in the side area of the guide element 28, there is a hole in which a catch plunger 74 is supported to be able to move back and forth. The catch plunger 74 has a recess which is matched to the dimensions of the ball 76. The catch plunger 74 is pre-tensioned via a catch spring 72 such that the ball 76 presses on the slider 30, the end of the catch spring 72 facing away from the catch plunger 74 being supported on the support plate 80 which is attached to the upper housing half 64 and/or the lower housing half 66. The slider 30 has a recess 78 which is arranged such that the ball 76 catches in the recess 78 when the slider is in the position which corresponds to the lock position of the system. If the lock system is moved out of the lock position, the ball 76 must be pressed out of the recess 78. The recess 78 is made such that the drive means 26 can apply a catch force, but unwanted displacement of the slider 30, for example, by the mass forces which occur (vibration, acceleration, braking of the vehicle and so forth) is not possible. As an alternative to the catch 32, the catch function could also be implemented by a sharpened, integrated spring in the slider; this represents a simple and favorable solution.

Figure 5:
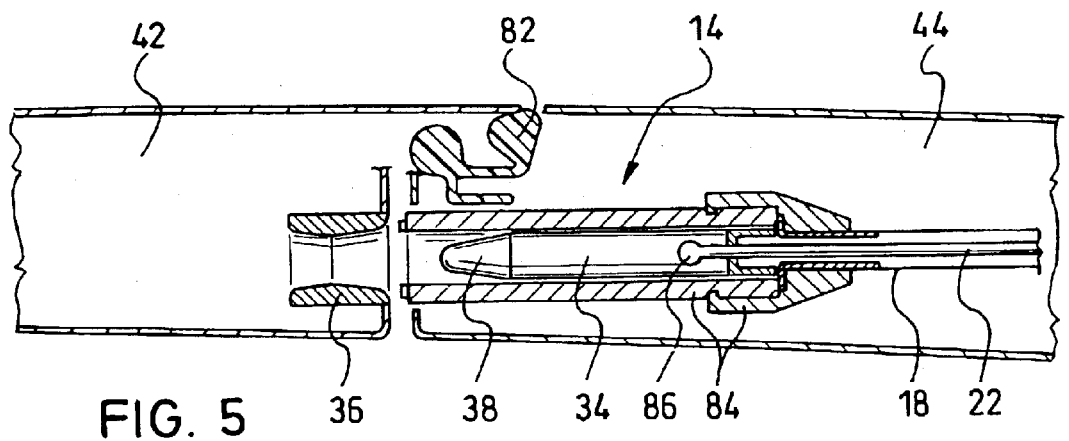
FIG. 5 is a lengthwise sectional view of the lock element from FIG. 1 in the first working position, arranged in the roof segment of a hardtop roof structure.
Figure 6:
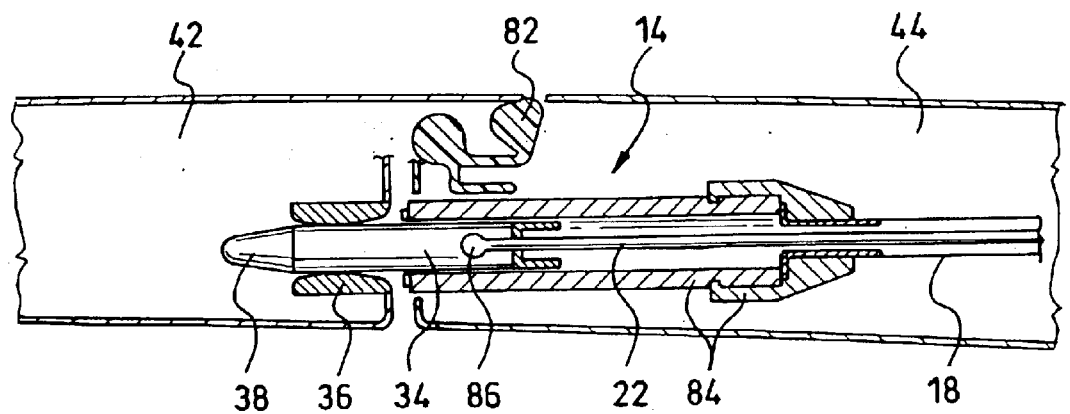
FIG. 6 is a lengthwise sectional view of the lock element from FIG. 1 in the second working position, arranged in the roof segment of a hardtop roof structure.

The schematic lengthwise sectional views as shown in FIGS. 5 & 6 illustrate the installation and assembly of the lock element 14 from FIG. 1. Here, the lock element 14 in FIG. 5 is shown in its open position, while in FIG. 6 it is shown in its closed position. The lock element 14 is integrated into a roof segment 44 of a hardtop roof structure. In the installation position shown, the lock element 14 is used to interlock the roof segment 44 with a front segment 42 which is likewise considered part of the hardtop roof structure. For this purpose, in the front segment 42, there is a bearing 36 which interacts with the lock element 14. Furthermore, a seal 82 is shown which is not of further interest here; it seals the front segment 42 relative to the roof segment 44 when the roof structure is in its closed position. The lock element 14 has a lock housing 84 which can be made in one or more parts. The jacket of the drive cable 18 is connected in a suitable manner to the lock housing 84.

A journal 34 is movably guided in the lock housing 84. The journal 34 is moved by the core 22 of the drive cable 18. To be able to apply both compressive and tension forces, the end section of the core 22 which is assigned to the lock element 14 has a fitting 86 which fits positively and/or non-positively into a recess which is provided in the journal 34. The journal 34 assumes the position shown in FIG. 5 when the slider 30 of the drive device 12 is in the position shown in FIG. 2. Accordingly, the journal 34 assumes the position shown in FIG. 6 when the slider 30 is in the position shown in FIG. 3. The journal 34 has a tapering end section 38 which facilitates insertion of the journal 34 into the bearing 36. The bearing 36 can be made both in one piece with, for example, the front segment 42 and also as a separate part. In the latter case suitable fasteners are assigned to the bearing 36 so that the bearing 36 can be attached to the respective component.

The bearing 36 has an insertion bevel which likewise facilitates insertion of the journal 34. On the one hand, the tolerances in the transverse and vertical direction are accommodated via the insertion bevel on the bearing 36 and the tapering section 38 of the journal 34, and on the other hand, a high locking force is achieved via the bevels. The tolerances which occur in the lengthwise direction (horizontally relative to the representation) of the entire lock system are completely accommodated by the freely movable journal 34. In this way, no tolerances occur in the central drive device 12, by which several lock elements can be easily driven.

In this case, locking in the lengthwise direction is not necessary since the kinematics fix the front segment 42 and the roof segment 44 relative to one another. In cases in which this does not seem adequate, in addition, a centering pin can be mounted in the lifting direction of the roof shells. Preferably, the journal 34 is retracted completely into the lock housing 84 and does not project from it in the open position shown in FIG. 5.

Figure 7:
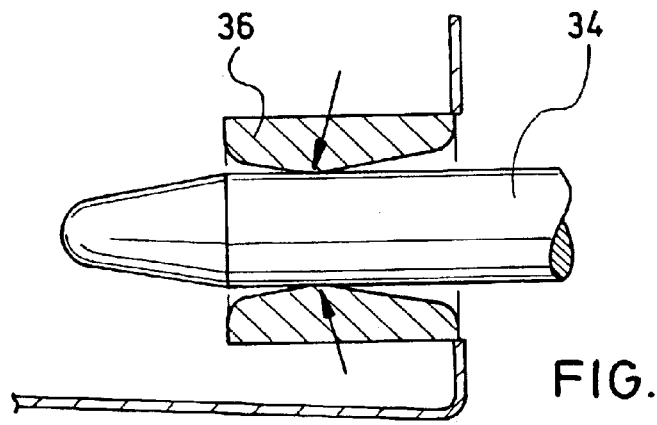
FIG. 7 shows one embodiment of the ring bearing in accordance with the invention.

FIG. 7 shows an embodiment of the ring bearing in accordance with the invention. The illustrated ring bearing 36 has, in addition to the aforementioned insertion bevel, another bevel so that contact between the bearing 36 and the journal 34 arises only at the points identified by the arrows. This point or annular contact is used to prevent tilting and/or jamming of the journal 34 or the entire lock system.

Figure 8:
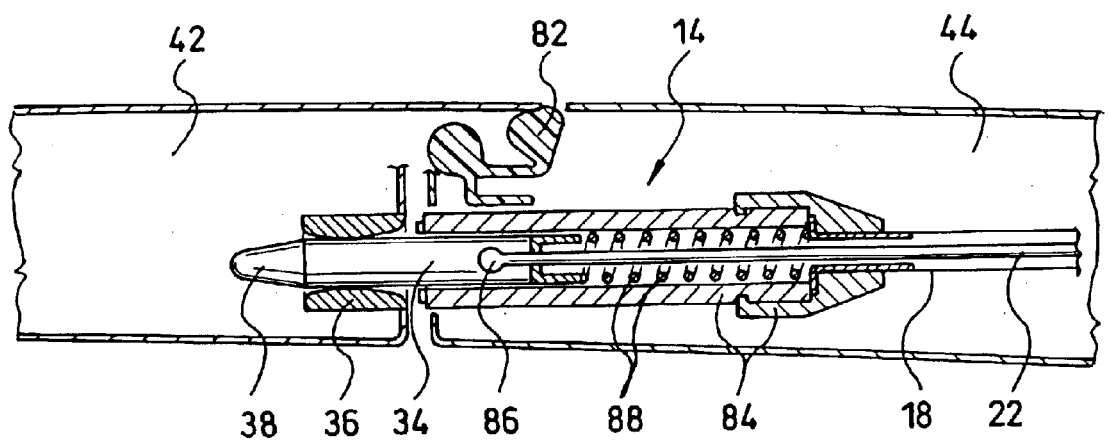
FIG. 8 is a lengthwise sectional view of another embodiment of the lock element arranged in the roof segment of a hardtop structure.

FIG. 8 shows another embodiment of the lock element 14, located in a roof segment 44 of a hardtop roof structure. The embodiment of the lock element 14 shown in FIG. 8 corresponds to that of FIGS. 5 & 6 except for the added pre-tensioning spring 88. The pre-tensioning spring 88 is supported by one end on the lock housing 84 and pretensions the journal 34 into its lock position. This can be advantageous, for example, when a stop of the journal 34 in the lengthwise direction is required or it is desirable for the conical surfaces to rest between the journal 34 and the bearing 36. The tolerance equalization in the lengthwise direction which is required in this case can be implemented via the pre-tensioning spring 88.

Figure 9:
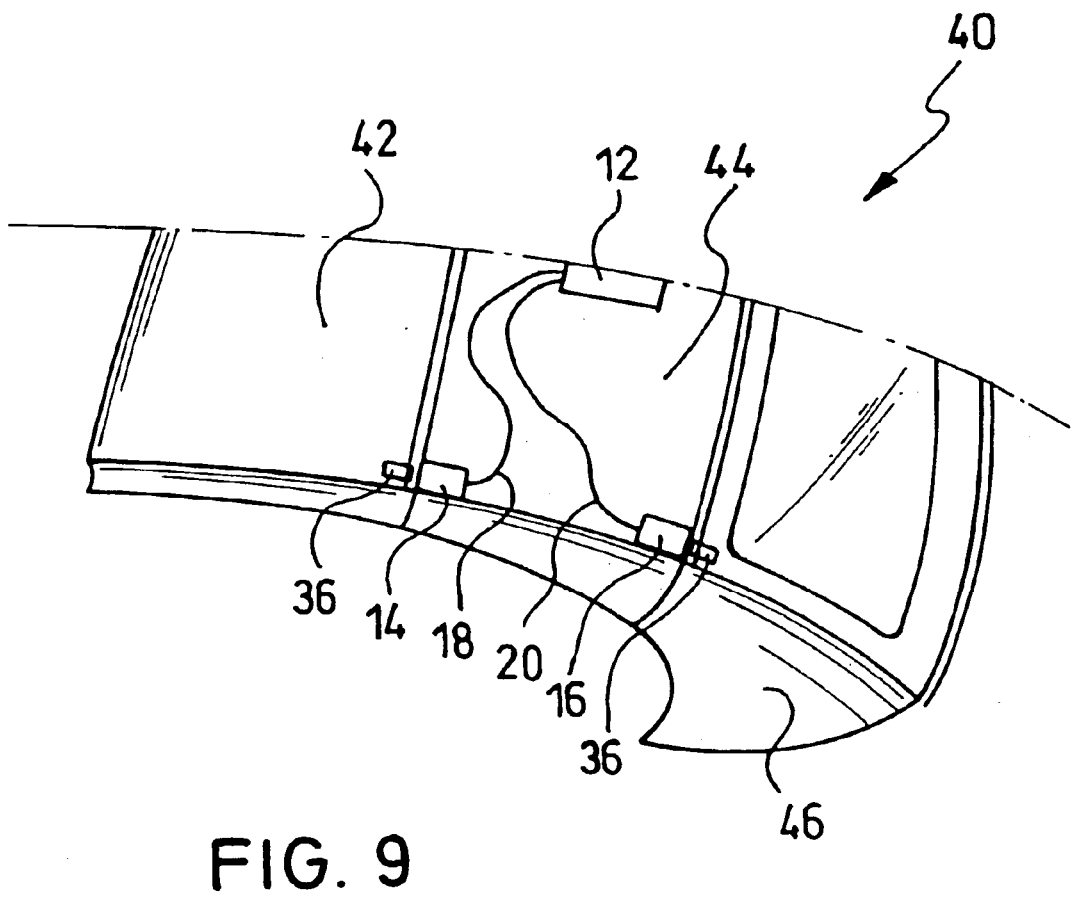
FIG. 9 is a schematic perspective view from above of one half of the roof structure in accordance with the invention for a cabriolet.

FIG. 9 shows a schematic of half of the roof structure 40 in accordance with the invention. The illustrated roof structure 40 is a hardtop roof structure which comprises a front segment 42, a roof segment 44 and a C column segment 46. If the roof structure is in its illustrated closed position, the individual segments 42, 44, and 46 are locked or interlocked by the lock system in accordance with the invention. The drive unit 12 of the lock system is attached in the middle in the roof shell 44 in this case. Two lock elements 14, 16 are located on the edge in the roof segment 44 and are designed to interact with bearings 36 which are located in the front segment 42 and the C column segment 46. The length of the drive cable 18, 20 need not be matched to the respective installation location of the lock elements 14, 16, since the drive cables 18, 20 can optionally be laid with loops.

The lock system in accordance with the invention can be used for diverse purposes, for example, to secure the segments 42, 44, and 46 in the stored package. In this way, the use of numerous identical parts is possible; this reduces costs. In the opened position of the roof structure, the segments 42, 44, 46 can be stored in the trunk. To prevent unwanted movements of the segments 42, 44, 46 it is advantageous to interlock them in the storage. Here, another journal 34 can fit into an existing bearing 36, for example, in the front segment 42. Of course, it is likewise possible for one or more journals 34 of the lock elements 14, 16 which are located in one or more of the segments 42, 44, 46 to fit into bearings 36 which are provided in the stowage space in which the stored package is deposited. This stowage space can be formed both by the trunk and also by a separate convertible top compartment. Of course, it is likewise possible for there to be a separate lock system in accordance with the invention in the area of the stowage space.

The features of the invention which are disclosed in the specification above, in the drawings and in the claims can be important to the implementation of the invention both individually and also in any combination.

What is claimed is:

1. Lock system for a cabriolet convertible top, comprising:
   at least two lock elements,
   a drive device for actuating said at least two lock elements, and
   a drive cable connected between the drive device and each of said at least two lock elements, said drive cable having a core which is able to transfer compressive and pulling forces.

2. Lock system in accordance with claim 1, wherein the drive device is adapted to synchronously actuate said at least two lock elements.

3. Lock system in accordance with claim 1, wherein the drive device comprises has at least one electrical, pneumatic, hydraulic, mechanical, and manual drive means for driving said core.

4. Lock system in accordance with claim 1, wherein the drive device has a slider which is guided by a guide element and which is connected to the core of each of the drive cables.

5. Lock system in accordance with claim 4, wherein the drive device limits the path of movement of the slider.

6. Lock system in accordance with claim 4, wherein the drive device has a catch which interacts with the slider in at least one position thereof.

7. Lock system in accordance with claim 1, wherein said at least one lock element has interlocking means for locking the cabriolet convertible top which comprises at least one of a journal and a hook for fitting into a bearing.

8. Lock system in accordance with claim 7, wherein said at least one lock element has at least one spring which pretensions the interlocking means in a direction toward a locking position.

9. Lock system in accordance with claim 8, wherein said at least one lock element has a journal which is cylinder-shaped at least in sections and which is engaged by the core of the respective drive cable in order to move the journal axially back and forth.

10. Lock system in accordance with claim 9 wherein the journal has a tapering end section which is movable for locking the cabriolet convertible top in or through an annular bearing.

11. Lock system in accordance with claim 10, wherein said annular bearing has an internal geometry which is adapted to produce an annular line of contact with the cylinder-shaped section of the journal.

12. Roof structure for a cabriolet having a plurality of roof segments and at least one lock system for locking at least one segment of the roof structure to at least one of another of said roof segments and a vehicle body structure, said at least one lock system comprising:

at least two lock elements, a drive device for actuating said at least two lock elements, and a drive cable connected between the drive device and each of said at least two lock elements, said drive cable having a core which is able to transfer compressive and pulling forces.

13. Roof structure in accordance with claim 12, wherein said plurality of roof segments comprises a front segment, a roof segment, and a C column segment, and wherein said at least one lock system is located in the roof segment to lock the roof segment to at least one of the front segment and the C column segment.

14. Roof structure in accordance with claim 12, wherein said at least one lock element has a journal which is cylinder-shaped at least in sections and which is engaged by the core of the respective drive cable in order to move the journal axially back and forth, wherein the journal has a tapering end section which is movable for locking the cabriolet convertible top in or through an annular bearing.

15. Roof structure in accordance with claim 14, wherein said at least one lock element comprises at least two lock elements, and wherein at least two said annular bearings are provided, each of which interacts with a respective lock element.

16. Cabriolet automobile having a vehicle body structure with a convertible roof formed of a plurality of roof segments and at least one lock system for locking at least one segment of the roof structure to at least one of another of the roof segments and the vehicle body structure, said at least one lock system comprising:

at least two lock elements, a drive device for actuating said at least two lock elements, and a drive cable connected between the drive device and each of said at least two lock elements, said drive cable having a core which is able to transfer compressive and pulling forces.

17. Cabriolet in accordance with claim 16, wherein the convertible roof, in a closed state, lockable by said at least one lock system, and wherein said at least one lock element has a journal which is cylinder-shaped at least in sections and which is engaged by the core of the respective drive cable in order to move the journal axially back and forth, wherein the journal has a tapering end section which is movable for locking the cabriolet convertible top in or through an annular bearing.

18. Cabriolet in accordance with claim 17, wherein the convertible roof, in an opened and stored state, is lockable by said at least one lock system, and wherein said at least one lock element has a journal which is cylinder-shaped at least in sections and which is engaged by the core of the respective drive cable in order to move the journal axially back and forth, wherein the journal has a tapering end section which is movable for locking the cabriolet convertible top in or through an annular bearing.

19. Cabriolet in accordance with claim 18, wherein at least one bearing interacts with a lock element first of said lock elements for securing the convertible roof in the closed state and with a second of the lock elements for securing the convertible roof in the opened and stored position.

20. Cabriolet in accordance with claim 16, wherein the convertible roof, in an opened and stored state, is lockable by said at least one lock system, and wherein said at least one lock element has a journal which is cylinder-shaped at least in sections and which is engaged by the core of the respective drive cable in order to move the journal axially back and forth, wherein the journal has a tapering end section which is movable for locking the cabriolet convertible top in or through an annular bearing.

* * * * *